United States Patent
Liu et al.

(10) Patent No.: US 10,517,115 B2
(45) Date of Patent: Dec. 24, 2019

(54) METHOD FOR PERFORMING RANDOM ACCESS, AND ASSOCIATED TERMINAL DEVICE

(71) Applicant: Telefonaktiebolaget LM Ericsson (publ), Stockholm (SE)

(72) Inventors: Jinhua Liu, Beijing (CN); Jianfeng Wang, Beijing (CN); Yanli Zheng, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/548,566

(22) PCT Filed: Mar. 29, 2016

(86) PCT No.: PCT/CN2016/077651
§ 371 (c)(1),
(2) Date: Aug. 3, 2017

(87) PCT Pub. No.: WO2017/166043
PCT Pub. Date: Oct. 5, 2017

(65) Prior Publication Data
US 2018/0124823 A1    May 3, 2018

(51) Int. Cl.
*H04W 74/00*    (2009.01)
*H04W 48/16*    (2009.01)
(Continued)

(52) U.S. Cl.
CPC ......... *H04W 74/008* (2013.01); *H04W 48/16* (2013.01); *H04W 72/042* (2013.01); *H04W 74/0833* (2013.01)

(58) Field of Classification Search
CPC . H04W 74/0833; H04W 74/08; H04W 48/16; H04W 48/20; H04W 74/00
(Continued)

(56) References Cited

U.S. PATENT DOCUMENTS

2008/0267126 A1* 10/2008 Vujcic ................. H04B 7/2637
                                                               370/330
2014/0177607 A1*  6/2014 Li ........................ H04B 7/0617
                                                               370/336
(Continued)

FOREIGN PATENT DOCUMENTS

CN          102045784 A     5/2011
CN          102802270 A     11/2012
(Continued)

OTHER PUBLICATIONS

Extended European Search Report for European Patent Application No. 16895824.7 dated Jul. 17, 2019—pp. 12.
(Continued)

*Primary Examiner* — Jeffrey M Rutkowski
*Assistant Examiner* — Luna Weissberger
(74) *Attorney, Agent, or Firm* — Sage Patent Group (57) ABSTRACT

The present disclosure relates to a method used in a terminal device for performing random access to a network device, and the associated terminal device. The method comprises: obtaining access related information from a predefined Minimum Common Entry Set (MCES) stored in the terminal device; and performing random access to the network device based on the access related information.

7 Claims, 5 Drawing Sheets

(51) Int. Cl.
*H04W 72/04* (2009.01)
*H04W 74/08* (2009.01)

(58) Field of Classification Search
USPC .......................................... 370/329
See application file for complete search history.

(56) References Cited

U.S. PATENT DOCUMENTS

| | | | | |
|---|---|---|---|---|
| 2014/0295836 | A1* | 10/2014 | Frenger | H04W 74/006 |
| | | | | 455/434 |
| 2015/0023283 | A1* | 1/2015 | Liu | H04W 36/08 |
| | | | | 370/329 |
| 2015/0245282 | A1 | 8/2015 | Kim et al. | |
| 2015/0256995 | A1 | 9/2015 | Rune et al. | |
| 2015/0288495 | A1* | 10/2015 | Tiirola | H04W 24/10 |
| | | | | 370/329 |

FOREIGN PATENT DOCUMENTS

| | | |
|---|---|---|
| EP | 2903349 A1 | 8/2015 |
| EP | 3345433 A1 | 7/2018 |
| WO | 2017036552 A1 | 3/2017 |

OTHER PUBLICATIONS

Frenger Pål et al.,: "A clean slate radio network designed for maximum energy performance", 2014 IEEE 25th Annual International Symposium on Personal, Indoor, and Mobile Radio Communications, (PIMRC), IEEE, Sep. 2, 2014 (Sep. 2, 2014), pp. 1300-1304.

Dr Pål Frenger et al., Ericsson Research, "From always available to always optimized" Towards 5G—5Green System Design, Summer School Aug. 27, 2014, Ericsson Confidential Jun. 17, 2014, XP055186153, Retrieved from the Internet: URL: http://wireless.kth.se/5green/wp-content/uploads/sites/19/2014/08/2014-08-27-PÅL-Frenger-5green-summer-school-Part-2-From-always-available-to-always-optimized-final.pdf [retrieved on Apr. 28, 2015], 28 Pages.

* cited by examiner

METHOD FOR PERFORMING RANDOM ACCESS, AND ASSOCIATED TERMINAL DEVICE

TECHNICAL FIELD

The present disclosure relates to radio communication, and more particularly, to a method used in a terminal device for performing random access to a network device, and the associated terminal device.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently, wireless communication networks or systems operating at high frequencies from 10-300 GHz are emerging as a promising technology to meet exploding bandwidth requirements by enabling multi-Gb/s speeds. For example, the 5th Generation (5G) network is likely to be a combination of the evolved 3rd Generation (3G) technologies, the 4th Generation (4G) technologies and emerging or substantially new components such as Ultra-Density Network (UDN).

Due to operating at high frequencies, network nodes (including terminal devices and network devices) will be deployed with high density in the 5G network. Considering the fact that the power energy cost takes a large ratio of Operating Expense (OPEX) for communication operators, the power efficiency becomes a focus in the initial design of the 5G network and the even future communication networks operating at high frequencies. Currently, in order to reduce energy consumption in such networks and to fully enable utilizing high gain beam forming or other multi-antenna techniques, a concept has been defined by separating the control/broadcast layer from the data plane. The broadcast layer consist of a broadcasted access information table (AIT) and a broadcasted system signature (SS). The system signature is used as synchronization signal for access node discovery and the AIT contains the mandatory information for radio connection setup.

Figure 1:
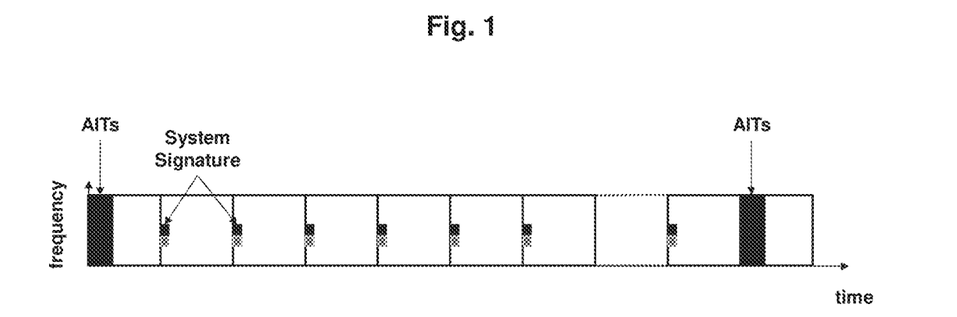
FIG. 1 shows timings of AIT and SS.

FIG. 1 shows timings of AIT and SS. The SS may be used to map information from the broadcasted AIT. The broadcasted signals should be able to send in a single frequency network (SFN) structure. Broadcasted information may contain parameter settings related to how to access a network device (random access) and be reached by the network device (paging). To reduce network energy consumption the broadcasted signals are expected to be infrequent compared to today's reference signals in cellular systems. The access information tables are typically transmitted with long periodicity. For example, AIT may be transmitted with a very long period, such as every 10.24 seconds, and SS may be broadcasted every 100 milliseconds to indicate the entry in the table and also provide the synchronization.

The SS may be assigned with a unique index (referred to as System Signature Index (SSI)) by the higher layer, and terminal devices may use SSI to determine the entry in the AIT to find parameters for the following initial random access (also referred to as access related information). The parameters may include but not limited to, the basic system information, the random access preamble settings, the time-frequency allocation for the preamble transmissions and scanning, etc.

Since the system information for random access, i.e., AIT, is very sparse to enhance the power efficiency as an important feature in the 5G network, there will result in a large access delay for terminal devices, which are newly powered up, have no latest AIT and/or newly enter a different communication coverage. Because the terminal devices have to wait for possible maximum 10.24 s, i.e., the AIT transmission period before doing random access, the delay would be not acceptable, even for the delay tolerate services such as short messages, web browsing, etc. Therefore, it is much important to ensure the random access delay within an acceptable range.

Figure 2:
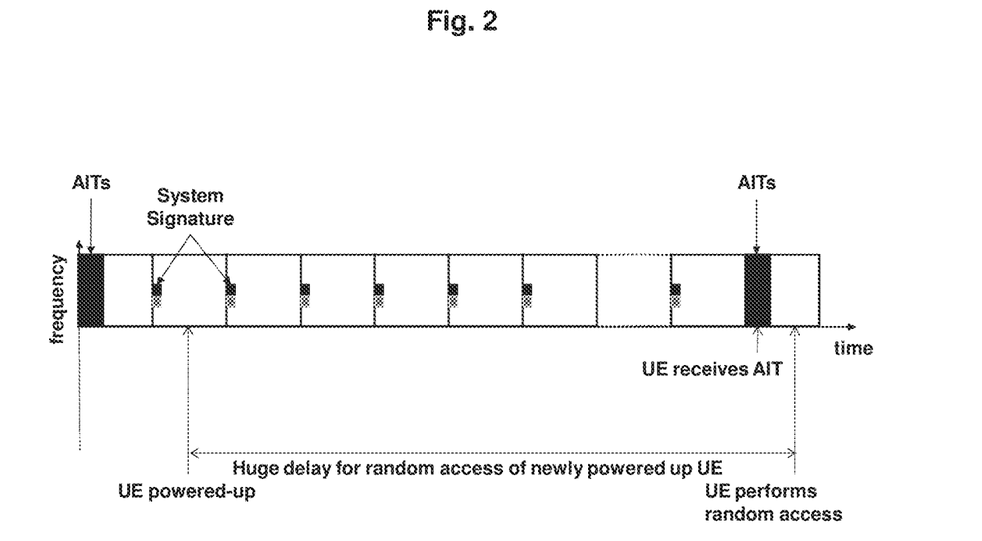
FIG. 2 illustrates an example of the initial access delay of a newly powered up terminal device.

FIG. 2 illustrates an example of the initial access delay of a newly powered up terminal device.

In the normal AIT, the entry would include a flexible set of random access parameters, including the preamble candidates, power, time (e.g., subframe), frequency (e.g., band) and spatial (e.g., beam) resources for all possible random access configurations, whose combination is indicated by the SSI. The combination needs to be flexible enough for all terminals to access the network device according to the scenario and requirements. Based on the successful detection on the SSI information, the terminal device knows in which time slot, band and transmit beam direction to send which sequence with the proper power. Correspondingly, the network device, e.g., eNodeB (eNB) (or equivalently speaking, Access Point (AP)), would scan received signals to detect whether there is any access request or not in the time slot, band and the beam receiving direction. To have as the better link performance as possible, the resource reserved for the random access can be optimized in the network device, such as optimized beam direction for the high beamforming gain with narrow beam. However, if there are many candidate beams, such as in a network device with massive Multiple Input Multiple Output (MIMO), the beams reserved for the random access have to be swept, since locations of terminal devices for the access request are not available. Such a flexibility results in the fact that the terminal devices might not know how to access the system before the AIT is determined.

SUMMARY

It is an object of the present disclosure to provide a method to reduce the maximum random access delay without considerable increase of the system overhead via a pre-definition of minimum common entry set (MCES), which includes a minimum set of random access configurations defined for the basic and normal random access requests without much information, such as narrow-beam information.

In a first aspect, a method used in a terminal device for performing random access to a network device is provided. The method comprises: obtaining access related information from a predefined MCES stored in the terminal device; and performing random access to the network device based on the access related information.

In an embodiment, said obtaining access related information from a predefined MCES stored in the terminal device comprises: obtaining a SSI value by scanning and selecting a SS; determining whether an entry of the SSI value is in an AIT containing normal access related information or not;

and reading the access related information from the predefined MCES if it is determined that the entry of the SSI value is not in the AIT.

In an embodiment, the method further comprises updating the MCES according to a system message received from the network device, during a registration procedure of the terminal device to the network device.

In an embodiment, the access related information obtained from the predefined MCES includes at least one or more of: a random access preamble; a time offset for transmission of the random access preamble to a SS transmission and a periodicity of the transmission of the random access preamble; time and frequency resources pre-allocated for the random access; spatial resources for the random access preamble transmission; and/or the TX (Transmit) power configuration parameters of random access preamble.

In a second aspect, a terminal device is provided for performing random access to a network device. The terminal device comprises: an obtaining unit configured to obtain access related information from a predefined MCES stored in the terminal device; and a random access unit configured to perform random access to the network device based on the access related information.

In a third aspect, a terminal device is provided for performing random access to a network device. The terminal device comprises a processor; and a memory storing instructions that when executed on the processor, cause the terminal device to: obtain access related information from a predefined MCES stored in the terminal device; and performing random access to the network device based on the access related information.

According to a fourth aspect of the present disclosure, there is provided a computer program product storing instructions that when executed, cause one or more computing devices to perform the method of the first aspect.

The above embodiments of the first aspect are also applicable for the second to the fourth aspects.

With the embodiments of the present disclosure, the terminal device can randomly select one entry from the MCES to perform random access procedure if there is no AIT available. In this way, the maximum random access delay for a newly powered-up terminal device or a terminal newly entering a network device coverage can be greatly reduced. Thereby, this can benefit the random access procedure in the 5G network and the future communication networks with sparse and small load system information broadcast and communication.

BRIEF DESCRIPTION OF THE DRAWINGS

The above and other objects, features and advantages will be more apparent from the following description of embodiments with reference to the figures, in which.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

In a typical communications network, a terminal device communicates via a Radio Access Network (RAN) to one or more Core Networks (CNs) through a network device. To do this, the terminal device needs to perform random access to the network device, once being newly powered up or newly entering a coverage of the network device.

The communications network may also be referred to as e.g. a wireless communications network, a wireless communications system, a communications network, a communications system, a network or a system. Although the following descriptions will exemplify the 5G network as the communications network, the communications network is not limited thereto, but may include any other appropriate wireless communications network operating at high frequencies.

The terminal device may be a device by which a subscriber may access services offered by an operator's network and services outside operator's network to which the operator's radio access network and core network provide access, e.g. access to the Internet. The terminal device may be any device, mobile or stationary, enabled to communicate over a radio channel in the communications network, for instance but not limited to e.g. User Equipment (UE), mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The terminal device may be portable, pocket storable, hand held, computer comprised, or vehicle mounted devices, enabled to communicate voice and/or data, via the radio access network, with another entity, such as another wireless device or a server. The network device sometimes may be referred to as e.g. a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, or a pico, depending on the technology and terminology used.

The present disclosure proposes to pre-define a MCES at a terminal device for use in random access, when there is no AIT available for random access. The MCES may be stored in a terminal device's memory or a SIM card of the terminal device in advance, and may be checked and updated after the terminal device accessing a corresponding network device.

The MCES according to the present disclosure may define access related information for use in random access, including, e.g., the basic resource information and related configurations set for terminal devices to access respective network devices. In the MCES, the access related information is provided as the simplified or pre-defined AIT with very limited options, e.g., without optimization on the sequence, time, frequency, beam and power. Each of the resources is selected from a set with a limited size, which can be simplified from the standard normal AIT containing normal access related information. Herein, the term "normal" means that the access related information contained in the AIT is used in the normal random access operation merely utilizing the AIT, and may be used to distinguish the access related information contained in the AIT from access related information as defined by the MCES according to the present disclosure.

According to the present disclosure, the access related information as defined in the MCES may include, for example, at least one or more of: a random access preamble; a time offset for transmission of the random access preamble to a SS transmission and a periodicity of the transmission of the random access preamble; time and frequency resources pre-allocated for the random access; spatial resources for the random access preamble transmission; and/or the TX power configuration parameters of random access preamble.

A random access preamble (i.e., a random access sequence) may be pre-reserved in the MCES. For example, the root and shifted values may be pre-defined if a ZC sequence is used as a random access preamble. A subset of the Physical Random Access CHannel (PRACH) preambles in the PRACH preamble pool may be reserved for MCES by predefinition. By way of an example, a set of random access preambles may be defined as $s=\{s_0, \ldots, s_{L-1}\}$ with L candidates.

A time offset, $T_{offset}$, for transmission of the random access preamble to a SS transmission and a periodicity, $T_{period}$, of the transmission of the random access preamble may be defined in the MCES to have the same pattern in each SS period. For example, a value of the time offset may be selected as $T_{offset}=\frac{1}{4}*T_{ss}$ and $T_{period}=T_{ss}$, where $T_{ss}$ is the periodicity of the SS transmission. As another example, $T_{period}=2T_{ss}$. According to the present disclosure, $T_{period}$ may be an integer multiple of $T_{ss}$.

Figure 3:
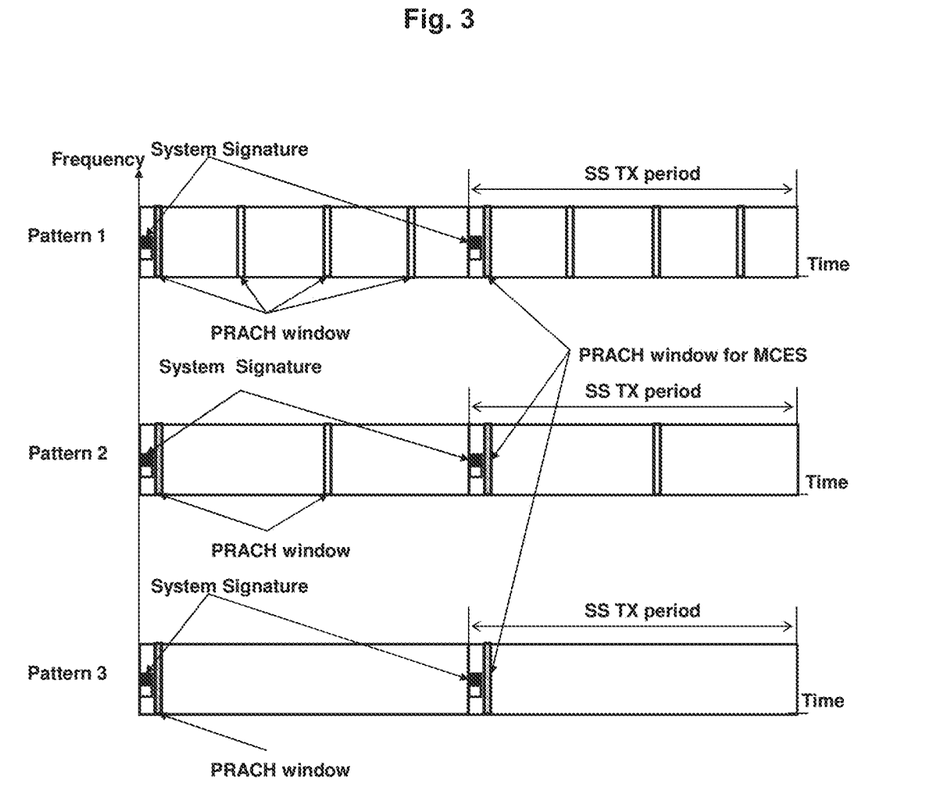
FIG. 3 shows an exemplary diagram illustrating time and frequency resources reserved for random access in MCES according to the present disclosure.

The MCES further defines time and frequency resources reserved for random access. FIG. 3 shows an exemplary diagram illustrating time and frequency resources reserved for random access in MCES according to the present disclosure. As shown in FIG. 3, an entry of the MCES may indicate the time (i.e., subframe) and frequency (i.e., band) pre-allocated for random access. For example, Pattern 1 in FIG. 3 specifies time and frequency resources for transmitting SS, e.g., a starting point and a period of SS transmission. Moreover, Pattern 1 further specifies PRACH windows. According to Pattern 1, the PRACH transmission window for random access according to the MCES (slashed occurrence) shares the PRACH transmission window with the normal random access according to the AIT, and there is 1 PRACH window for random access according to the MCES every 4 PRACH transmission windows for normal random access according to the AIT. That is, the MCES may share PRACH windows with normal random access according to the AIT with different PRACH preambles.

Moreover, a frequency band reserved for the random access may be obtained from the SS operating band, e.g., the same center frequency as the SS transmission, and the bandwidth of the preamble is also predefined in a set with a limited size. It is always referred to the length of the PRACH preamble in the MCES and the subcarrier spacing used by the SS.

The access related information further includes spatial resources (i.e., beam direction) for the random access preamble transmission. To avoid extra overhead on the narrow beam sweeping, the wide beam without or with a very small number of times for sweeping is preferred. In this case, terminal devices in certain coverage can scan the preamble without the beam direction information. Thus, in the MCES, there could not be beam information as an extreme option.

As a part of the access related information, the TX power configuration parameters of random access preamble may be defined in the MCES. The preamble transmission power can apply an additional high power offset, because the resource reserved for the random access based on MCES is sparse. Thus, it is meaningful to reduce the failure ratio of the first attempt by increasing the initial transmission power. Or equivalently, the desired received power shall be higher than that for the random access based on the normal AIT. For instance, the following formula may be used for preamble power determination as $P_{TX}=P_{RX}+G_{DL}+\Delta_0+\Delta_a$, where $P_{RX}$ is the desired received power for the preamble detection, $G_{DL}$ is the path loss measured by the terminal device according to the SS, $\Delta_0$ is the power offset for the preamble detection following the normal AIT and $\Delta a$ is the additional power offset (usually positive) for the preamble detection following the MCES. In practice, $\Delta_0+\Delta_a$ may be defined as one parameter dedicated for the preamble transmission power.

As an example, one uniform MCES may be predefined for the whole 5G network by the owned operator of the subscriber. This can be stored in the terminal device's memory or SIM card. This is, the MCES determination at the terminal device side does not rely on the SSI index.

Figure 4:
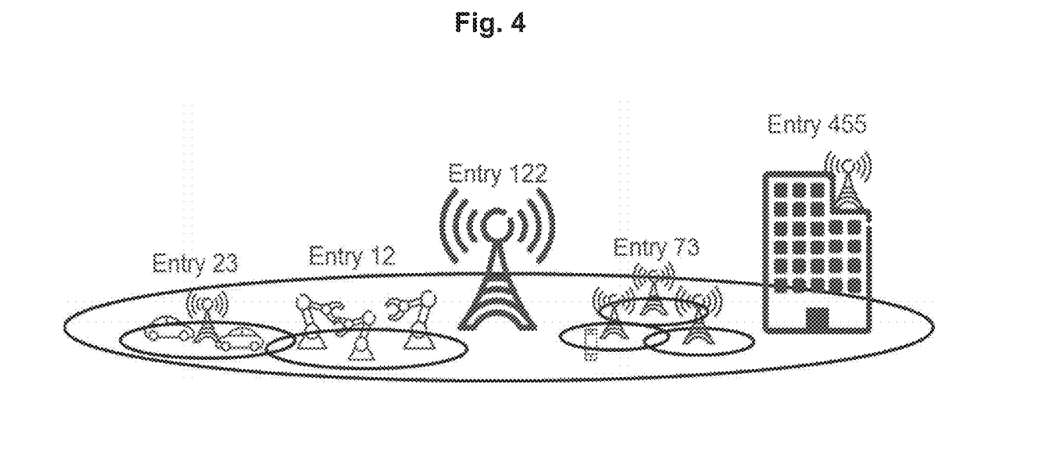
FIG. 4 illustrates different MCES implementation scenarios according to the present disclosure.

As another example, different reserved random access resources combinations defined in the MCES can be implemented for different scenarios, such as indoor, outdoor or high speed as illustrated in FIG. 4.

FIG. 4 illustrates different MCES implementation scenarios according to the present disclosure. As shown, terminal devices may do a 'region-based' random access procedure, which is compared with the 'SSI-based' random access procedure. For example, entry 23 is defined for a high speed scenario, and entry 455 is defined for an indoor scenario.

There are two ways to indicate the entry to terminal devices in a region, one is to implicitly indicate the entry according to the SSI detection and the other is to explicitly indicate by in the extra bits as the system information bits. To be specific, in the former way, terminal devices may obtain an entry in the MCES from the SSI detection. This means there is an implicit mapping relationship between SSI and the entry in MCES. For example, the SSI range can be used for that mapping. According to this option, when different condition needs different MCES, different condition shall use different specific SSI set. The other way is to indicate the entry with extra bits, which can be stored together with MCES or delivered in the communication. This provides flexibility to configure the MCES at the cost of added overhead.

Figure 5:
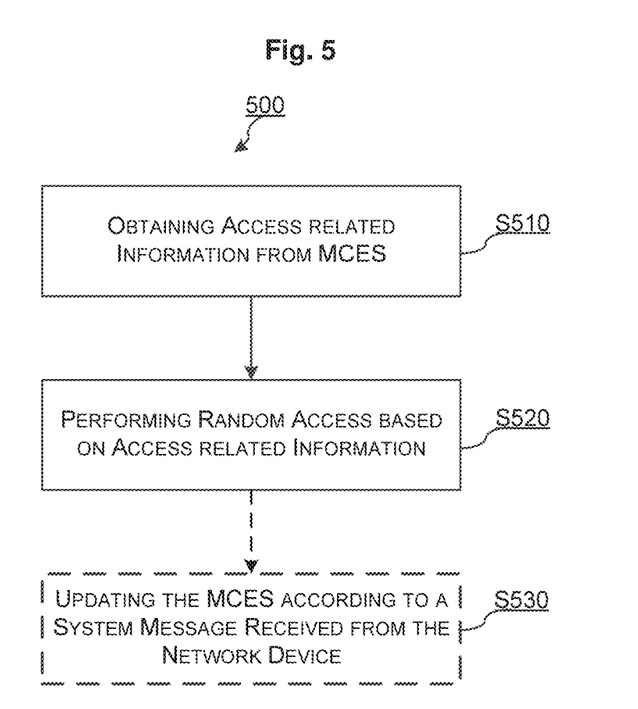
FIGS. 5-6 illustrate a method 500 used in a terminal device for performing random access to a network device according to embodiments of the present disclosure.

FIG. 5 is a flowchart illustrating a method 500 used in a terminal device for performing random access to a network device according to embodiments of the present disclosure.

At step S510, the terminal device obtains access related information from a predefined MCES stored in the terminal device. The access related information obtained from the predefined MCES may include at least one or more of: a random access preamble; a time offset for transmission of the random access preamble to a SS transmission and a periodicity of the transmission of the random access preamble; time and frequency resources pre-allocated for the random access; spatial resources for the random access preamble transmission; and/or the TX power configuration parameters of random access preamble.

At step S520, the terminal device performs random access to the network device based on the access related information.

Optionally, the method 500 may further comprise step S530. At step S530, the MCES may be updated according to a system message received from the network device, during a registration procedure of the terminal device to the network device.

Figure 6:
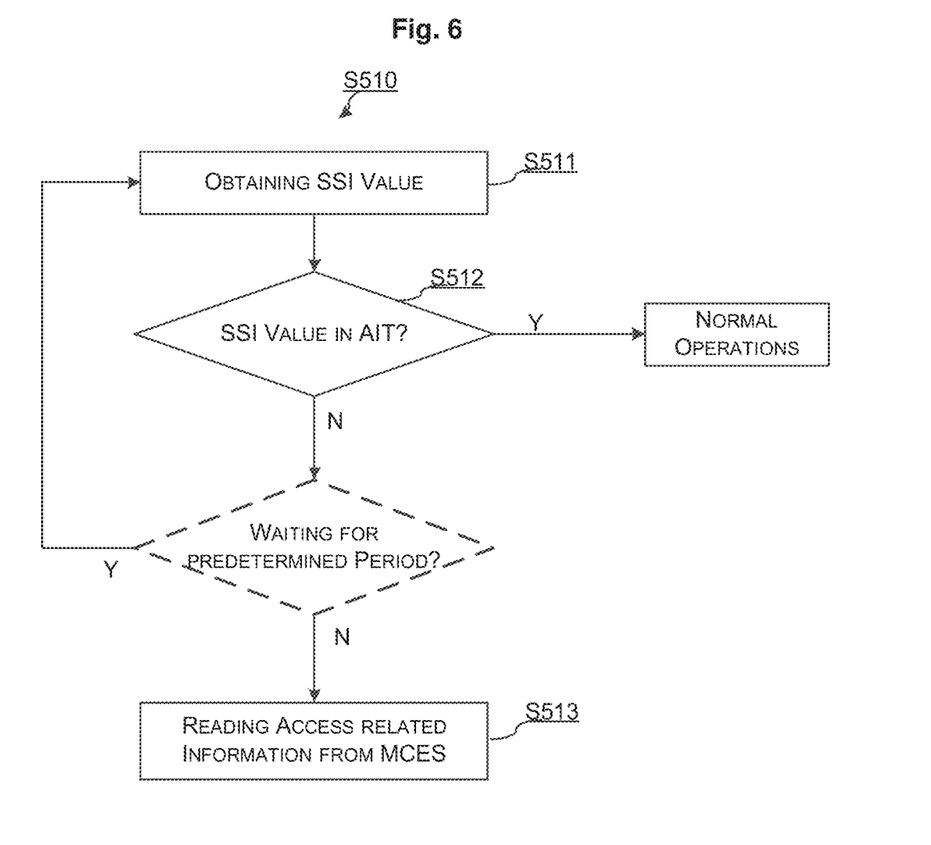

In an implementation, the step S510 may be implemented as shown in FIG. 6.

At step S511, the terminal device obtains a SSI value by scanning and selecting a SS. For example, the SS may be scanned and selected in Layer 1 (L1).

At step S512, the terminal device determines whether an entry of the SSI value is in an AIT or not. For example, the AIT may be broadcasted by the network device following the timing as shown in FIG. 1. The AIT may contain normal access related information defined by the network device for random access of the terminal device to the network device.

If it is determined that the entry of the SSI value is not in the AIT (i.e., "N" branch from the block S512), the terminal device reads the access related information from the predefined MCES at step S513, so as to obtain the access related information.

In a further implementation, when it is determined that the entry of the SSI value is not in the AIT, the terminal device may decide whether to wait the subsequent AIT transmissions or not, i.e., whether to wait for a predetermined period since determining that the entry of the SSI value is not in the AIT, as denoted by the dashed block of FIG. 6. This may depend on the higher layer application delay requirement and a time length between the scanned SS and the next AIT transmission. If the predetermined period can be tolerant, the terminal device may return to step S511 for the subsequent AIT, as illustrated in FIG. 6. Otherwise, if the predetermined period can't be tolerant, i.e., the terminal device will not wait for the predetermined period, the terminal device will proceed with step S513 once determining that the entry of the SSI value is not in the AIT. In this way, the terminal device would do a region-based random access without a long delay for the AIT.

According to this implementation, terminal devices without requirements on the high link quality, such as Machine-Type Communication (MTC) terminals, can quickly access corresponding network devices.

If it is determined that there is an entry of the SSI value in the AIT (i.e., "Y" branch from the block S512), the terminal device will perform normal random access operations. For example, the terminal device may read access related information corresponding to the SSI value from the AIT, and then perform random access to the network device based on the access related information read from the AIT.

With the introduction of the MCES, the method 500 can reduce the maximum random access delay for the newly powered-up terminal device or the newly entering terminal device without AIT in the 5G network and other future networks.

Figure 7:
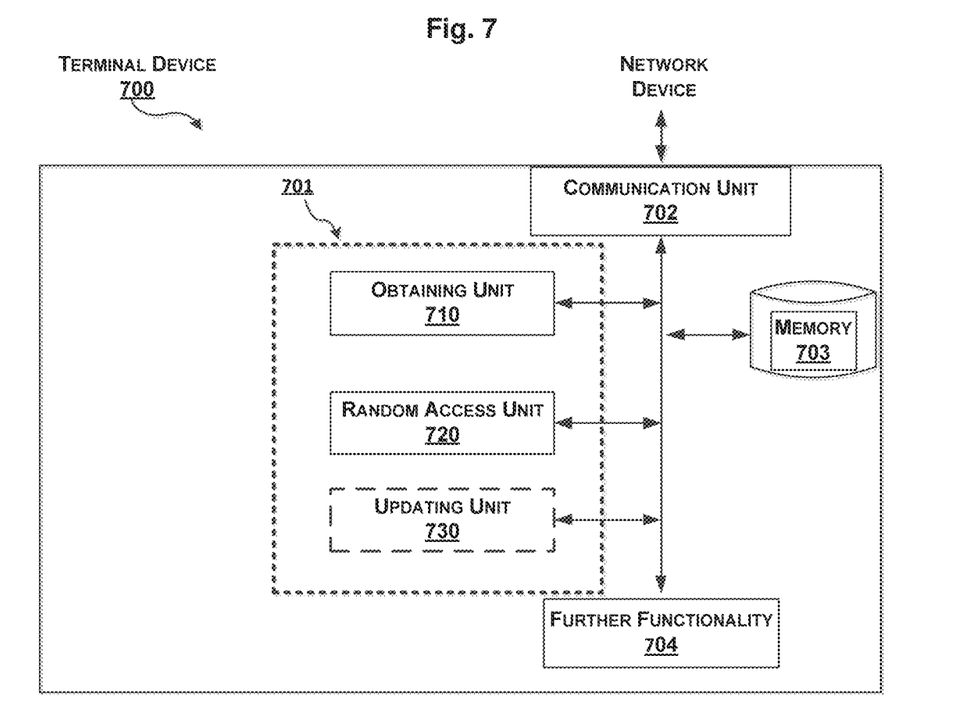
FIG. 7 is a schematic block diagram of a terminal device 700 according to embodiments of the present disclosure.

FIG. 7 is a schematic block diagram of a terminal device 700 according to embodiments of the present disclosure. The terminal device 700 is to perform random access to a network device.

The part of the terminal device 700 which is most affected by the adaptation to the herein described method, e.g., the method 500, is illustrated as an arrangement 701, surrounded by a dashed line. The terminal device 700 and arrangement 701 are further configured to communicate with other entities such as the network device via a communication unit 702 which may be regarded as part of the arrangement 701. The communication unit 702 comprises means for wireless communication. The arrangement 701 or the terminal device 700 may further comprise other functional units 704, such as functional units providing regular functions for a terminal device, and may further comprise one or more memories 703.

The arrangement 701 could be implemented, e.g., by one or more of: a processor or a microprocessor and adequate software and memory for storing of the software, a Programmable Logic Device (PLD), or other electronic component(s) or processing circuitry configured to perform the actions described above, and illustrated, e.g., in FIGS. 5 and 6. The arrangement part of the terminal device 700 may be implemented and/or described as follows.

Referring to FIG. 7, the terminal device 700 comprises an obtaining unit 710, a random access unit 720 and an updating unit 730. The updating unit 730 is optional.

The obtaining unit 710 may be configured to obtain access related information from a predefined MCES stored in the terminal device 700, e.g., in the memory 703. The access related information obtained from the predefined MCES may include at least one or more of: a random access preamble; a time offset for transmission of the random access preamble to a SS transmission and a periodicity of the transmission of the random access preamble; time and frequency resources pre-allocated for the random access; spatial resources for the random access preamble transmission; and/or the TX power configuration parameters of random access preamble.

The random access unit 720 may be configured to perform random access to the network device based on the access related information.

The updating unit 730 may be configured to update the MCES according to a system message received from the network device, during a registration procedure of the terminal device to the network device.

In an implementation, the obtaining unit 710 may be further configured to: obtain a SSI value by scanning and detecting a SS, e.g., in L1; determine whether an entry of the SSI value is in an AIT containing normal access related information or not; and read the access related information from the predefined MCES if it is determined that the entry of the SSI value is not in the AIT.

Figure 8:
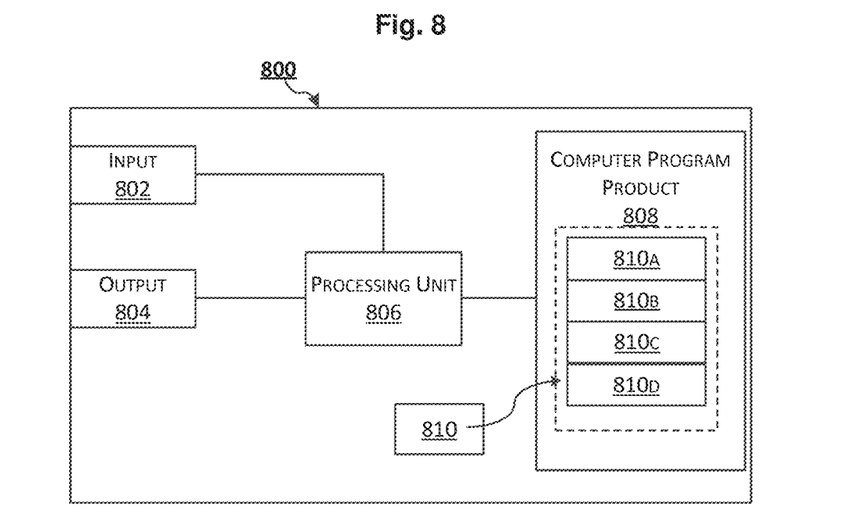
FIG. 8 schematically shows an embodiment of an arrangement 800 comprising at least one particular computer program product 808 according to embodiments of the present disclosure.

FIG. 8 schematically shows an embodiment of an arrangement 800 comprising at least one particular computer program product 808 according to embodiments of the present disclosure. The arrangement 800 may be used in the terminal device 700 according to the present disclosure. Comprised in the arrangement 800 are here a processing unit 806, e.g., with a Digital Signal Processor (DSP). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit and the output unit may be arranged as an integrated entity or as illustrated in the example of FIG. 8.

Furthermore, the at least one computer program product 808 may be in the form of a non-volatile or volatile memory, e.g., an Electrically Erasable Programmable Read-Only Memory (EEPROM), a flash memory and a hard drive. The computer program product 808 comprises a computer program 810, which comprises code/computer readable instructions, which when executed by the processing unit 806 in the arrangement 800 causes the arrangement 800 and/or the terminal device in which it is comprised to perform the actions, e.g., of the procedure described earlier in conjunction with FIG. 5 and/or FIG. 6

The computer program 810 may be configured as a computer program code structured in computer program modules 810A-810D. Hence, in an exemplifying embodiment when the arrangement 800 is used in the terminal device 700, the code in the computer program of the arrangement 800 includes an obtaining module 810A, for obtaining access related information from a predefined MCES stored in the terminal device 700, e.g., in the memory 703. The code in the computer program 810 further includes a random access module 810B, for performing random access to the network device based on the access related information. The code in the computer program 810 may further include an updating module 810C, for updating the MCES according to a system message received from the network device, during a registration procedure of the terminal device to the network device. The code in the computer program 810 may comprise further modules, illustrated as module 810D, e.g. for controlling and performing other related procedures associated with the terminal device's operations.

The computer program modules could essentially perform the actions of the flow illustrated in FIG. 5 and/or FIG. 6, to emulate the terminal device 700. In other words, when the different computer program modules are executed in the processing unit 806, they may correspond, e.g., to the units 710-730 of FIG. 7.

Although the code means in the embodiments disclosed above in conjunction with FIG. 8 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the terminal device.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a terminal device for performing random access to a network device, the method comprising:
obtaining access-related information from a predefined Minimum Common Entry Set (MCES) stored in the terminal device,
wherein the access-related information obtained from the predefined MCES includes a random access preamble, a time offset for transmission of the random access preamble to a System Signature (SS) transmission and a periodicity of the transmission of the random access preamble, time and frequency resources pre-allocated for the random access, and spatial resources that includes a beam direction for the random-access preamble transmission, and
wherein the time offset for transmission of the random access preamble to the SS transmission is selected based on a periodicity of the SS transmission; and
performing random access to the network device based on the access-related information;
wherein said obtaining access-related information from the predefined MCES stored in the terminal device comprises:
obtaining a System Signature Index (SSI) value by scanning and selecting a System Signature (SS);
determining whether an entry of the SSI value is in an Access Information Table (AIT) containing normal access-related information or not, wherein the AIT is received in a broadcast; and
reading the access-related information from the predefined MCES if it is determined that the entry of the SSI value is not in the AIT.

2. The method of claim 1, further comprising:
updating the MCES according to a system message received from the network device,
during a registration procedure of the terminal device to the network device.

3. The method of claim 1, wherein, the access-related information obtained from the predefined MCES includes the TX power configuration parameters of random-access preamble.

4. A terminal device for performing random access to a network device, the terminal device comprising:
a processor; and
a memory storing instructions that when executed on the processor, cause the terminal device to:
obtain access-related information from a predefined Minimum Common Entry Set (MCES) stored in the terminal device,
wherein the access-related information obtained from the predefined MCES includes a random access preamble, a time offset for transmission of the random access preamble to a System Signature (SS) transmission and a periodicity of the transmission of the random access preamble, time and frequency resources pre-allocated for the random access, and spatial resources that includes a beam direction for the random-access preamble transmission, and
wherein the time offset for transmission of the random access preamble to the SS transmission is selected based on a periodicity of the SS transmission; and
perform random access to the network device based on the access-related information,
wherein the instructions cause the terminal to obtain the access-related information from the predefined MCES by:
obtaining a System Signature Index (SSI) value by scanning and selecting a System Signature (SS);
determining whether an entry of the SSI value is in an Access Information Table (AIT) containing normal access-related information or not, wherein the AIT is received in a broadcast; and reading the access-related information from the predefined MCES if it is determined that the entry of the SSI value is not in the AIT.

5. The terminal device of claim 4, wherein the instructions when executed on the processor further enable the terminal device to:

update the MCES according to a system message received from the network device, during a registration procedure of the terminal device to the network device.

6. The terminal device of claim 4, wherein, the access-related information obtained from the predefined MCES includes the TX power configuration parameters of random-access preamble.

7. A non-transitory computer-readable medium comprising, stored thereupon, a computer program product storing instructions configured so that, when executed by a processing circuit in a terminal device, the instructions cause the terminal device to:

obtain access-related information from a predefined Minimum Common Entry Set (MCES) stored in the terminal device, wherein the access-related information obtained from the predefined MCES includes a random access preamble, a time offset for transmission of the random access preamble to a System Signature (SS) transmission and a periodicity of the transmission of the random access preamble, time and frequency resources pre-allocated for the random access, and spatial resources that includes a beam direction for the random-access preamble transmission, and wherein the time offset for transmission of the random access preamble to the SS transmission is selected based on a periodicity of the SS transmission; and perform random access to the network device based on the access-related information, wherein the instructions cause the terminal to obtain the access-related information from the predefined MCES by:

obtaining a System Signature Index (SSI) value by scanning and selecting a System Signature (SS);

determining whether an entry of the SSI value is in an Access Information Table (AIT) containing normal access-related information or not, wherein the AIT is received in a broadcast; and reading the access-related information from the predefined MCES if it is determined that the entry of the SSI value is not in the AIT.

* * * * *